United States Patent
Xu et al.

(10) Patent No.: US 8,351,724 B2
(45) Date of Patent: Jan. 8, 2013

(54) BLUE SKY COLOR DETECTION TECHNIQUE

(75) Inventors: Xinyu Xu, Vancouver, WA (US); Hao Pan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 624 days.

(21) Appl. No.: 12/387,864

(22) Filed: May 8, 2009

(65) Prior Publication Data

US 2010/0284614 A1  Nov. 11, 2010

(51) Int. Cl.
*G06K 9/40* (2006.01)

(52) U.S. Cl. ........................ 382/254; 382/260

(58) Field of Classification Search ........................ None
See application file for complete search history.

(56) References Cited

U.S. PATENT DOCUMENTS

| | | | |
|---|---|---|---|
| 5,450,217 A | 9/1995 | Eschbach et al. | |
| 6,504,951 B1 | 1/2003 | Luo et al. | |
| 6,771,311 B1 | 8/2004 | Weldy | |
| 6,856,704 B1 | 2/2005 | Gallagher et al. | |
| 7,356,193 B2* | 4/2008 | Gallagher | 382/254 |
| 7,433,104 B2 | 10/2008 | Cheo et al. | |
| 7,478,091 B2 | 1/2009 | Mojsilovic et al. | |
| 7,853,094 B2* | 12/2010 | Pan et al. | 382/254 |
| 7,978,910 B2* | 7/2011 | Bang et al. | 382/164 |
| 8,238,654 B2* | 8/2012 | Pan et al. | 382/167 |
| 2003/0053686 A1* | 3/2003 | Luo et al. | 382/165 |
| 2005/0147298 A1 | 7/2005 | Gallagher et al. | |
| 2005/0195212 A1 | 9/2005 | Kurumisawa et al. | |
| 2007/0110305 A1 | 5/2007 | Corcoran et al. | |
| 2007/0171443 A1* | 7/2007 | Pan | 358/1.9 |
| 2007/0172118 A1* | 7/2007 | Pan | 382/162 |
| 2007/0172119 A1* | 7/2007 | Pan et al. | 382/162 |
| 2008/0166044 A1* | 7/2008 | Pan et al. | 382/167 |
| 2009/0024395 A1 | 1/2009 | Banba | |

FOREIGN PATENT DOCUMENTS

| | | |
|---|---|---|
| EP | 1326425 B1 | 8/2008 |
| JP | 10-269360 | 10/1998 |
| JP | 2005-012793 | 1/2005 |
| JP | 2007-208979 | 8/2007 |
| JP | 2009-060431 | 3/2009 |
| WO | WO 02/99557 A2 | 12/2002 |

OTHER PUBLICATIONS

J. Luo and S.P. Etz, "A physical model-based approach to detecting sky in photographic images," IEEE Transactions on Image Processing, 2002, vol. 11, No. 3.

(Continued)

*Primary Examiner* — Tom Y Lu (74) *Attorney, Agent, or Firm* — Chernoff Vilhauer McClung & Stenzel (57) ABSTRACT

An image enhancement technique includes a filter that receives an input image and provides a low-pass filtered image that maintains a substantial number of edges therein. The low pass filtered image is provided a likelihood of being a sky color for each pixel of the low pass filtered image. The low-pass filtered image is filtered based upon a user selection to selectively enhance the sky color. The low-pass filtered image and the filtered low-pass filtered image are blended based upon the user selection based upon the likelihood. The blended image is combined with a high pass filtered input image to provide an enhanced image.

16 Claims, 12 Drawing Sheets

OTHER PUBLICATIONS

A.C. Gallagher, J. Luo, W. Hao, "Improved blue sky detection using polynomial model fit," International Conference on Image Processing, 2004, vol. 4, pp. 2367-2370.

Barman Zafarifar, Peter De With, "Blue sky detection for picture quality enhancement," Advanced Concepts for Intelligent Vision Systems, 2006, pp. 522-532.

J-Y You and S-I Chien, "Saturation enhancement of blue sky for increasing preferences of scenery images," IEEE Transactions on Consumer Electronics, 2008, vol. 54, No. 2.

International Search Report and Written Opinion dated Jun. 15, 2010 in co-pending International App. No. PCT/JP2010/058070, filed Apr. 30, 2010; pp. 1-7.

* cited by examiner

Figure 10. (a) The color gamut in the x-y chart. (b) Illustration of sky score of the colors in (a).

| $a_3$ | $a_4$ | $a_5$ | $a_6$ | $a_7$ |
|---|---|---|---|---|
| $a_2$ | $a_1$ | $a_0$ | | |

BLUE SKY COLOR DETECTION TECHNIQUE

CROSS-REFERENCE TO RELATED APPLICATIONS

Not applicable.

BACKGROUND OF THE INVENTION

The present invention relates to a blue sky color detection technique.

Sky is an important subject matter seen in photographic images. The identification of sky in images facilitates its enhancement and image manipulation.

The most prominent characteristic of sky tends to be its color, which is usually light blue when the sky is clear. Such a characteristic has been used to detect sky in images.

There exists conventional techniques of enhancing the color of a color image. One technique involves image-dependent color saturation correction in a natural scene pictorial image disclosed in U.S. Pat. No. 5,450,217. In this method, color saturation is enhanced in an HSV color space, which is considered as being capable of representing an image to have almost the same saturation as a recognized saturation of the image. However, this method can enhance the color saturation of certain images only, which have an average saturation of no higher than a certain threshold value.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
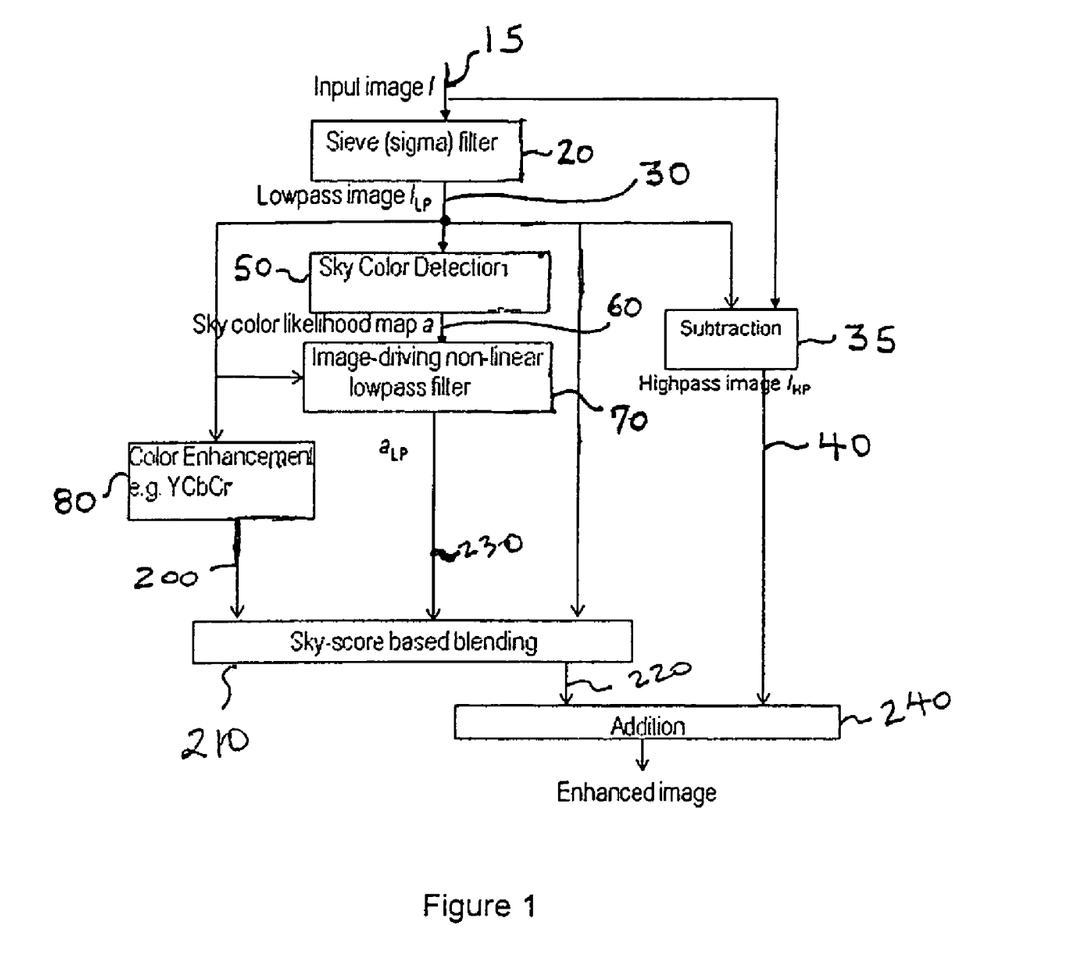
FIG. 1 illustrates a sky detection technique.

A diagram illustrating a sky detection technique 10 is illustrated in FIG. 1. It is desirable to enhance the color of the sky in a manner that is visually appealing to the viewer, such as for example, increasing the saturation of the sky. However, it is likewise desirable to do this enhancement in a manner that does not simultaneously unnecessarily increase the noise and artifacts in the image which may be objectionable to the viewer. To reduce increasing the noise and artifacts while simultaneously enhancing sky regions, a two-channel decomposition technique may be used. The two-channel decomposition technique spatially decomposes the input image 15 into a low pass image and a high pass image by using a spatial filter 20, such as a sigma filter. The low pass spatial image tends to include sky regions which are generally low frequency content. The output of the spatial filter 20 is a lowpass image 30. The high-pass image 40 may be created by subtracting 35 the low pass image 30 from the input image 15.

The low pass image, containing fewer details and artifacts which may be representative of sky regions is passed through an image enhancement technique so the image is more visually appealing to the viewer. The high pass image, containing high frequency details and artifacts is not passed through a similar enhancement technique so as avoid enhancing such artifacts which may be objectionable to the viewer. In this manner, the spatial regions of the image tending to include limited amount of details and noise and sky regions are enhanced, while the spatial regions of the image tending to include artifacts, noise and details are not similarly enhanced.

As previously noted, the sigma filter 20 decomposes the input image into the low pass image 30 and the high pass image 40. The sigma filter utilizes a one dimensional or two dimensional rectangular window, where the current pixel I(x, y) is at the center of the window. The sigma filter compares all (or a selected set of) the pixels I(i,j) in the window with the central pixel I(x,y) (or other suitable pixel), and averages those pixels whose value differences with the central pixel I(x,y) is within a threshold T. Because the filter drops pixels that are not within the threshold, this filter is generally referred to as a sigma filter and is non-linear. Mathematically, the output of the sigma filter 30, $I_{LP}(x,y)$, may be calculated as follows:

$$I_{LP}(x, y) = \frac{\sum_{(i,j) \in E \& |I(i,j)-I(x,y)|<T} I(i, j)}{N(x, y)}$$

where E is the window; N(x,y) is the count of the pixels in E that satisfy the condition of $|I(i,j)-I(x,y)|<T$. The parameters of the sigma filter, the widow E and the threshold T, may be chosen using any technique, such as being selected empirically.

Because the sigma filter is also a smoothing filter preserving sharp edges, the low pass image generated by a sigma filter contains few high frequency details but does contain sharp edges, and the high pass image therefore contains details, noises, and artifacts but few sharp edges. The low-pass image, in general, tends to resemble a cartoon image. The preservation of sharp edges tends to assist in the identification of those regions that are likely to be sky colors.

Figure 2:
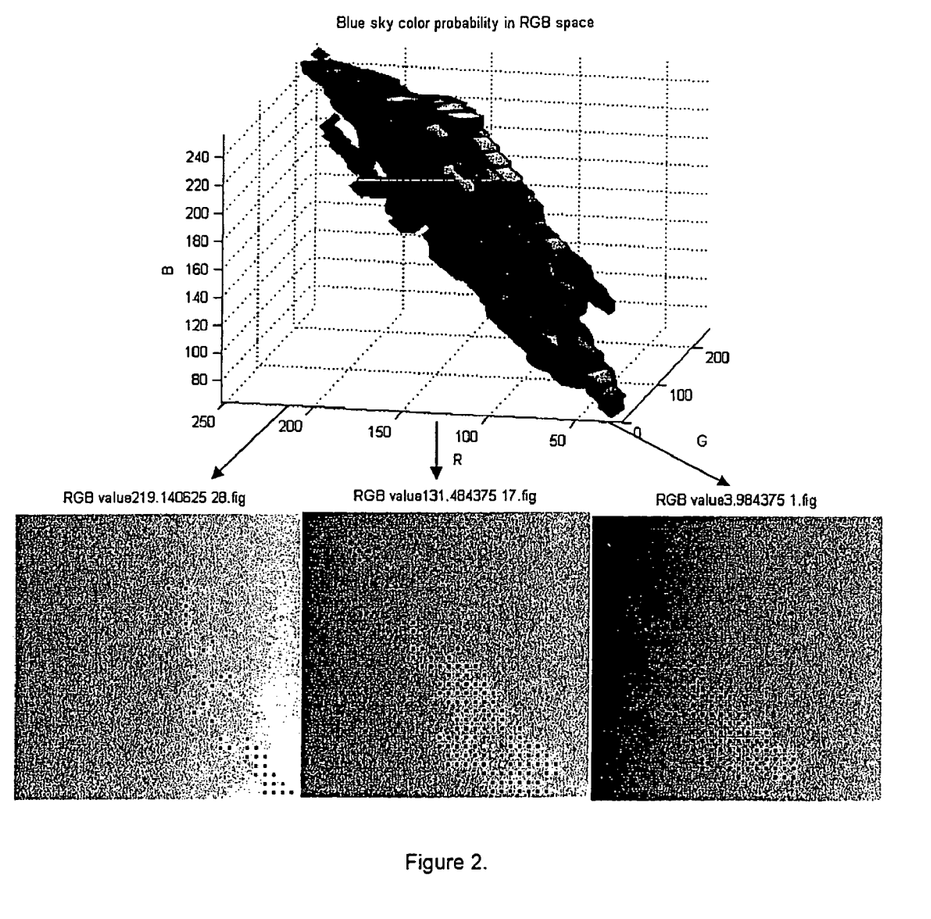
FIG. 2 illustrates a set of image used to determine sky colors.
Figure 3:
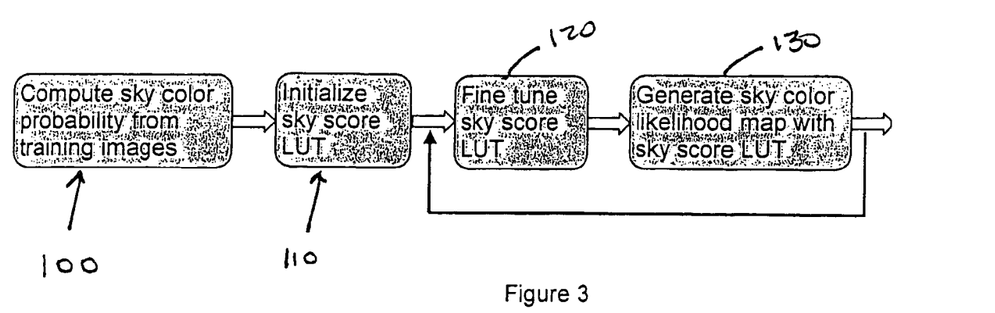
FIG. 3 illustrates look up table generation.

Sky color detection 50 is based upon the low-pass image 30 from the sieve filter 20. Referring to FIG. 3, the sky color detection 50 may be based upon a sky color probability 100 which is the probability that a particular color (represented by HSV color space or RGB color space or other color space) is a sky color. The sky color probability 100 may be for a predefined set of colors or other basis. However, it is preferable that the sky color probability 100 is based upon a training set of images by computing the color histogram of segmented sky regions from those training images. One exemplary sky color probability is based upon a set of sample images, such as those illustrated in the FIG. 2. The sky color probability 100 is preferably not directly used as the sky score used in the sky color detection 50. The reason is that, first, the three dimensional sky color probability 100 contains abrupt changes in the color space, and it may also contain holes, both of which will lead to a rough output. Thus, the sky color probability distribution provides a useful informational baseline for roughly deciding the location and size of the sky color region in the color space. Second, due to the inherent limited number of training sky images, some sky colors might not appear in the training set, therefore these colors will have low probability in the learned probability set.

The sky color probability 100 is used to initialize a sky score look up table 110. The entries in the look up table 110 are adjusted based upon testing on a large set of sky and non-sky images. The adjustment of the look up table 110 involves fine tuning the sky score look up table 120, generating sky color likelihood map using the sky score look up table 130, and repeating the process until a suitable sky score look up table is created. The resulting sky score look up table is used as the basis for the sky color detection 50.

If the system directly uses the RGB color space for the look up tables, such as the table for the sky color detection 50, then the system would incorporate a three dimensional LUT. It is computationally complex to adjust a three dimensional LUT. To reduce the computational complexity it is desirable to modify the RGB color space to a different color space, such as the HSV (hue, saturation, value) color space. With the color space modification, the three dimensional lookup table may be replaced by four two-dimensional look up tables and two one-dimensional look up tables. It is more computationally efficient to adjust multiple two dimensional and one dimensional look up tables than a single three dimensional look up table.

Figure 4:
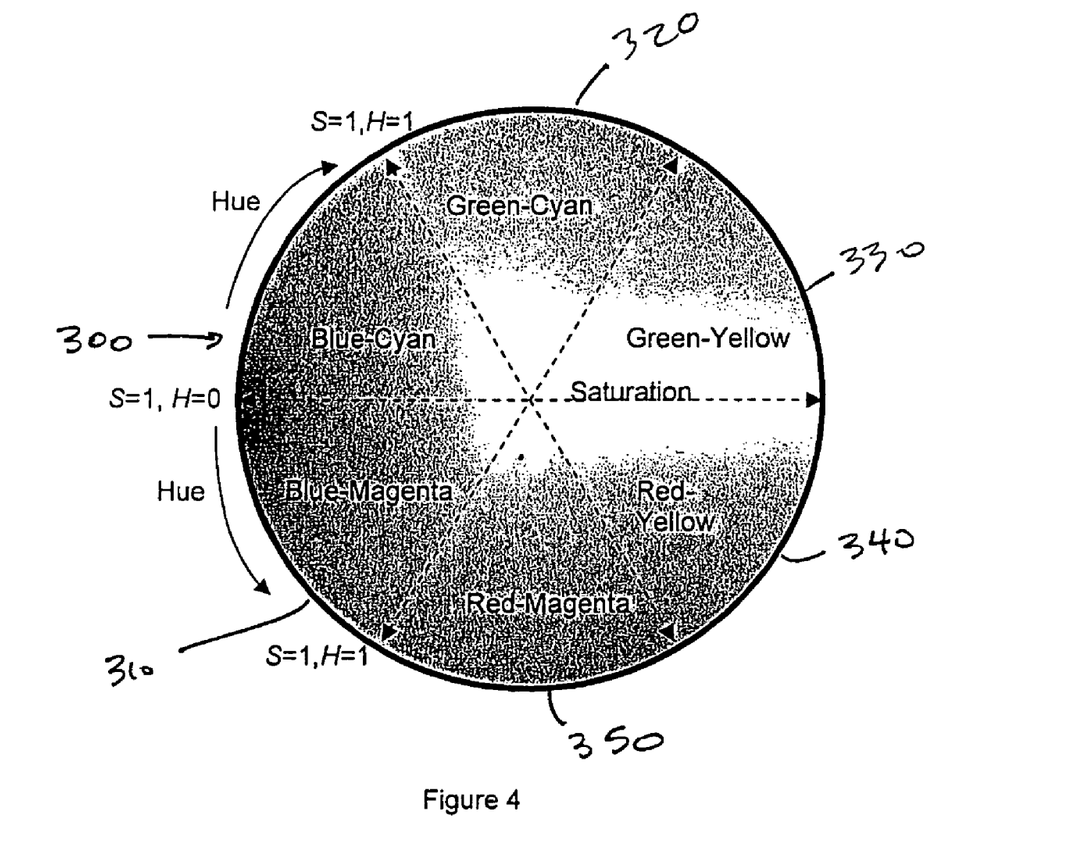
FIG. 4 illustrates a hue, saturation, value chart.

One technique to modify the color space is to first divide the RGB color space into six areas, and then define hue (H), saturation (S) and value (V) separately in the six areas (note that while S and V are defined by the typical definition, H here has a nonstandard definition), and then define the sky score for each area. The blue-cyan area is described in detailed with the remaining areas being similar. The six color areas and S and H are illustrated in FIG. 4.

The blue-cyan 300 (blue>green>red), may be defined as follows:

$$S = \frac{b-r}{b}$$
$$H = \frac{g-r}{b-r}$$
$$V = b$$

S and H are between 0 and 1. When S is 0, r=g=b and the color is the white; when S is 1, r is 0 and the color is most saturated. When H is 0, g=r and the color is blue; when H is 1, g=b and the color is cyan.

The sky score may be modeled by the following equation:

$$skyScore_{BY}(H,S,V) = f_{BC}(S,H) \cdot w(V)$$

Where $f_{BC}(S,H)$ models LUT function based on the S and H, and it is given by:

$$f_{BC}(S,H) = ((b-r)*p(b), (g-r)*q(b-r))$$

The above equation may be implemented by concatenation of one dimensional LUTs and two dimensional LUTs. The calculation uses one two dimensional LUTs for $f_{BC}(\bullet,\bullet)$, and two one dimensional LUTs for $p(\bullet)$ and $q(\bullet)$.

Calculating the sky score solely based on S and H may not reflect the true sky likelihood. For instance, if sky score is solely based on H and S, some low-luminance blue colors (V is small and B>R&B>G, e.g. [R G B]=[45 47 50]) will typically receive very high sky score which should not be the case since perceptually these colors will look like black and therefore sky score shall be low such that only small saturation boosting is enforced. In this case the second component w(V) plays a role to pull down the high score assigned to the low-luminance blue colors. w(V) may be given as:

$$w(V) = \begin{cases} 0, & V < V_0 \\ \text{linear function of } V, & V_0 \leq V \leq V_1 \\ 1, & V > V_1 \end{cases}$$

Figure 5:
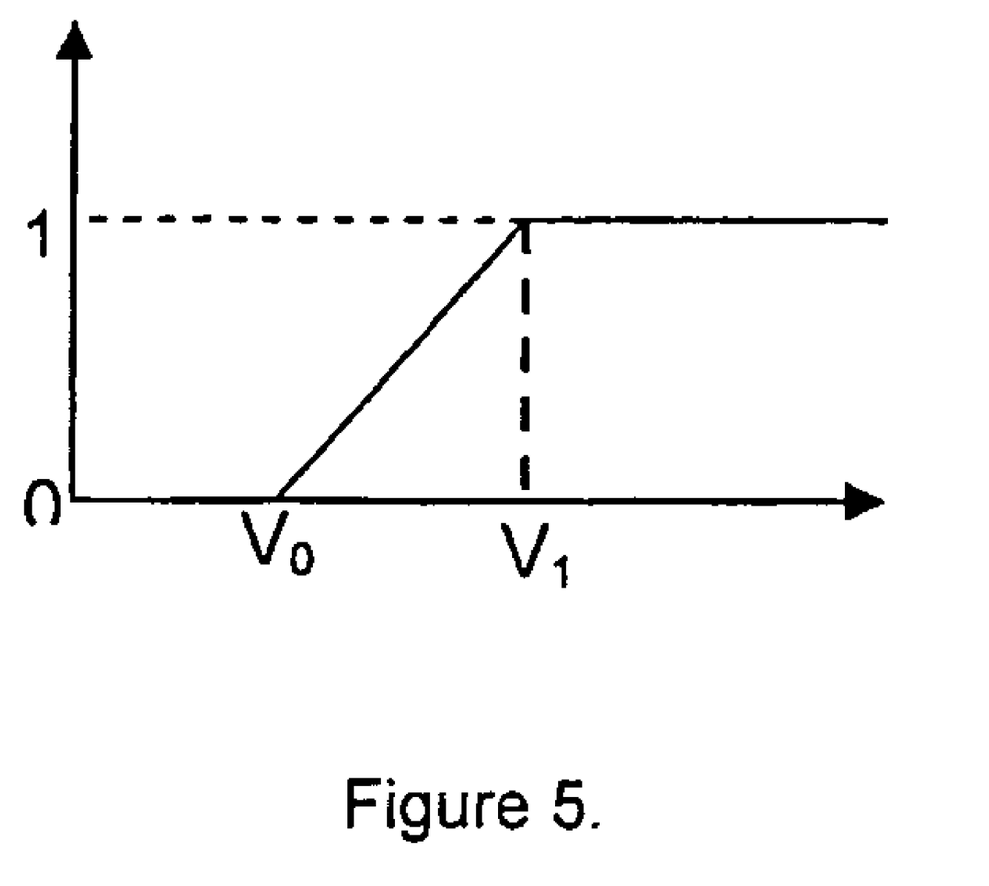
FIG. 5 illustrates a weight function used to pull down the score of low-luminance blue color.

One embodiment of the w(V) is shown in FIG. 5. This form of the w(V) allows a linear, smooth transition of the sky score when V falls into $[V_0 \ V_1]$. Generally, one may can also use other nonlinear functions (like power function) to model w(V).

Figure 6:
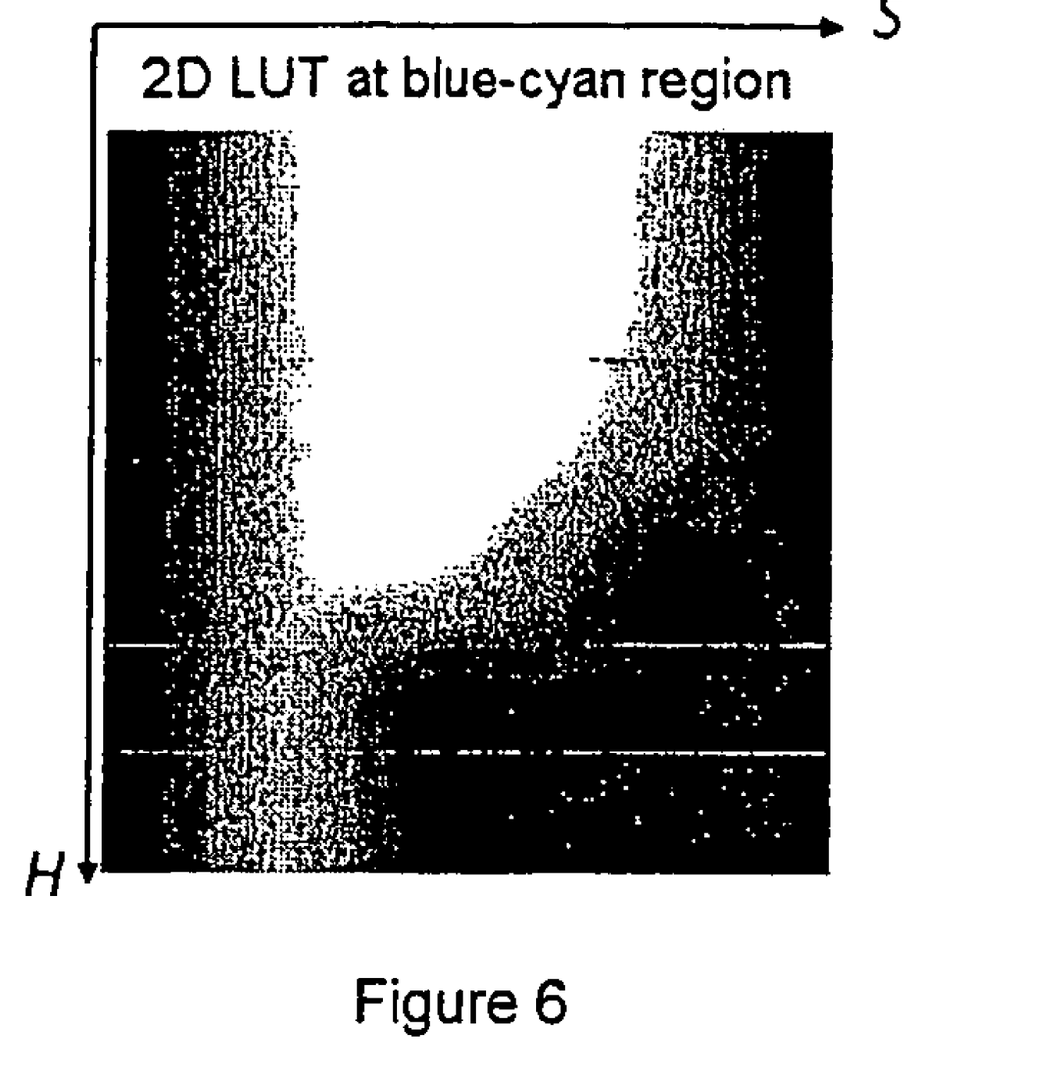
FIG. 6 illustrates a two dimensional LUT at blue-cyan region.

The two dimensional LUT $f_{BC}(\bullet,\bullet)$ is illustrated in FIG. 6 where the x-axis is the first argument S, and they-axis is the second argument H. White: 1; black: 0; gray: between 0 and 1.

The blue-magenta 310 (blue>red>green) may be defined as follows:

$$S = \frac{b-g}{b} \qquad (6)$$
$$H = \frac{r-g}{b-g}$$
$$V = b$$

$$skyScore_{BM}(H, S, V) = f_{BM}((b-g)*p(b), (r-g)*q(b-g)) \cdot w(V)$$

Figure 7:
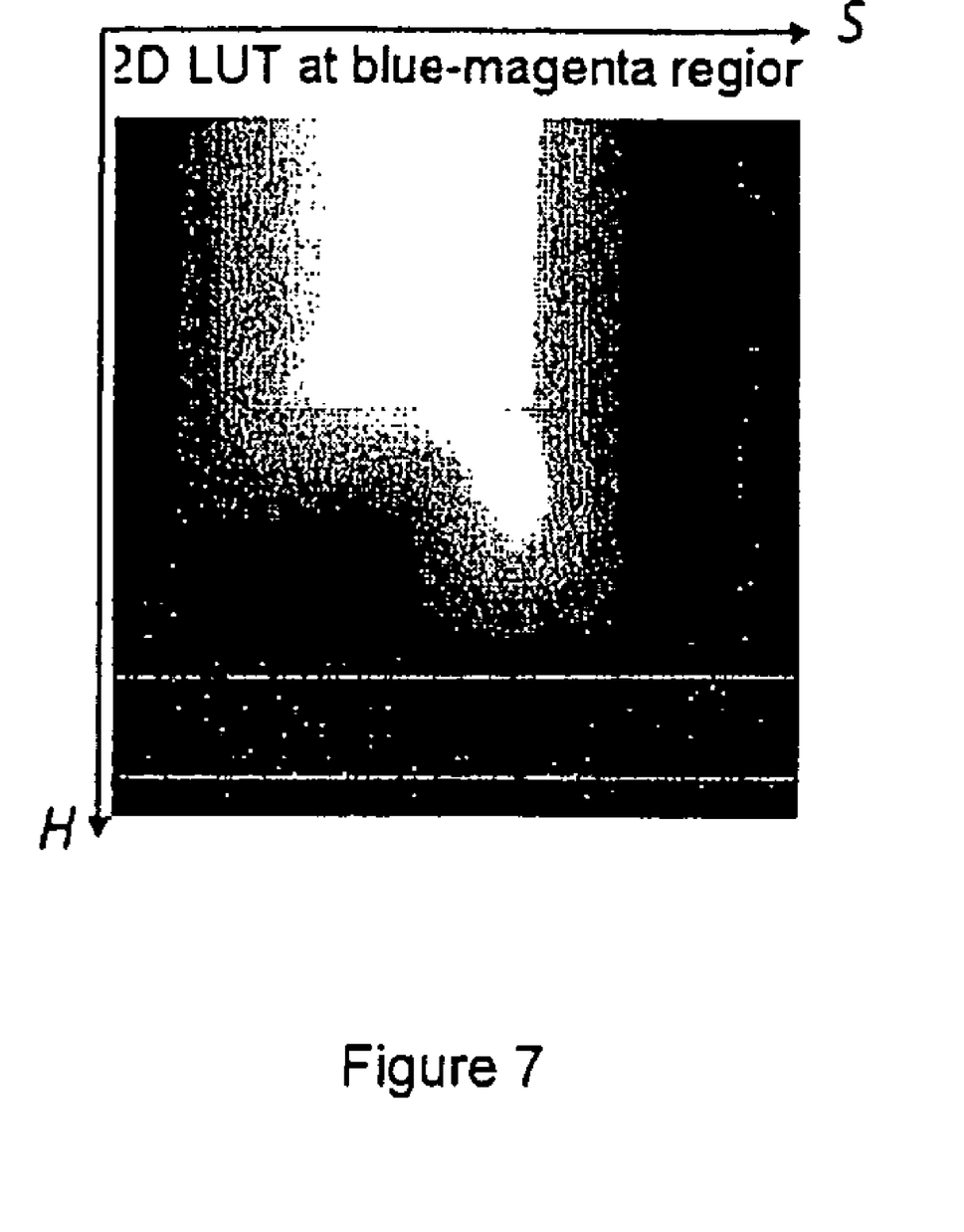
FIG. 7 illustrates a two dimensional LUT at blue-magenta region.

The calculation uses a different two dimensional LUT for $f_{BM}(\bullet,\bullet)$, the same two one dimensional LUTs for $p(\bullet)$ and $q(\bullet)$ and the same w(V). The two dimensional LUT $f_{BM}(\bullet,\bullet)$ is illustrated in FIG. 7. The x-axis is the first argument S, and they-axis is the second argument H. White: 1; black: 0; gray: between 0 and 1.

The green-cyan 320 (green>blue>red), may be defined as follows:

$$S = \frac{g-r}{g}$$
$$H = \frac{b-r}{g-r}$$
$$V = g$$

$$skyScore_{GC}(H, S, V) = f_{GC}((g-r)*p(g), (b-r)*q(g-r)) \cdot w(V)$$

Figure 8:
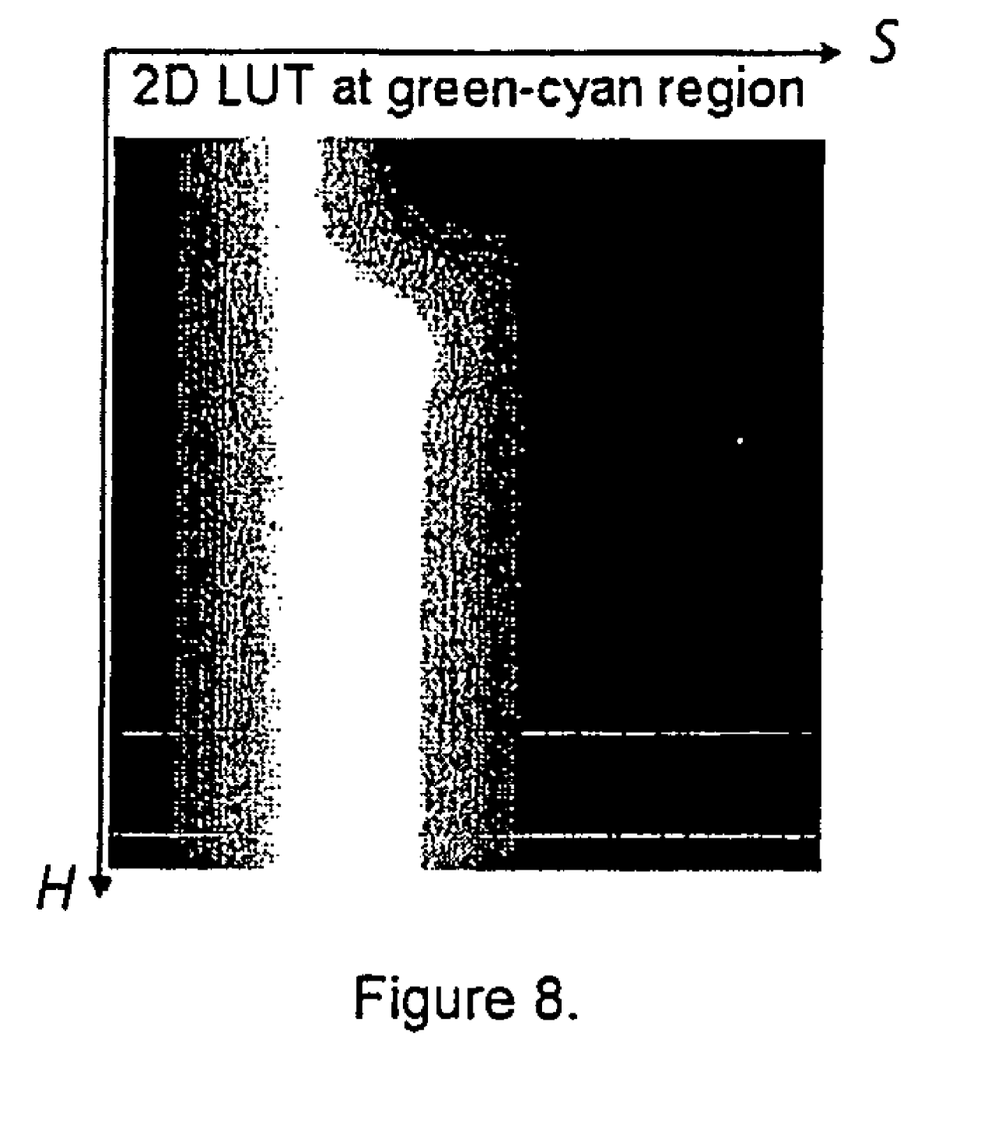
FIG. 8 illustrates a two dimensional LUT at green-cyan region.

The calculation uses a two dimensional LUT for $f_{GC}(\bullet,\bullet)$ and the same two one dimensional LUTs for $p(\bullet)$ and $q(\bullet)$. The two dimensional LUT $f_{GC}(\bullet,\bullet)$ is illustrated in FIG. 8 where the two dimensional LUT for $f_{GC}(\bullet,\bullet)$. The x-axis is the first argument S, and they-axis is the second argument H. White: 1; black: 0; gray: between 0 and 1.

The green-yellow 330 (green>red>blue), may be defined as follows:

$$S = \frac{g-b}{g}$$

$$H = \frac{r-b}{g-b}$$

$$V = g$$

$$skyScore_{GY}(H, S, V) = f_{GY}((g-b)^*p(g), (r-b)^*q(g-b)) \cdot w(V)$$

Figure 9:
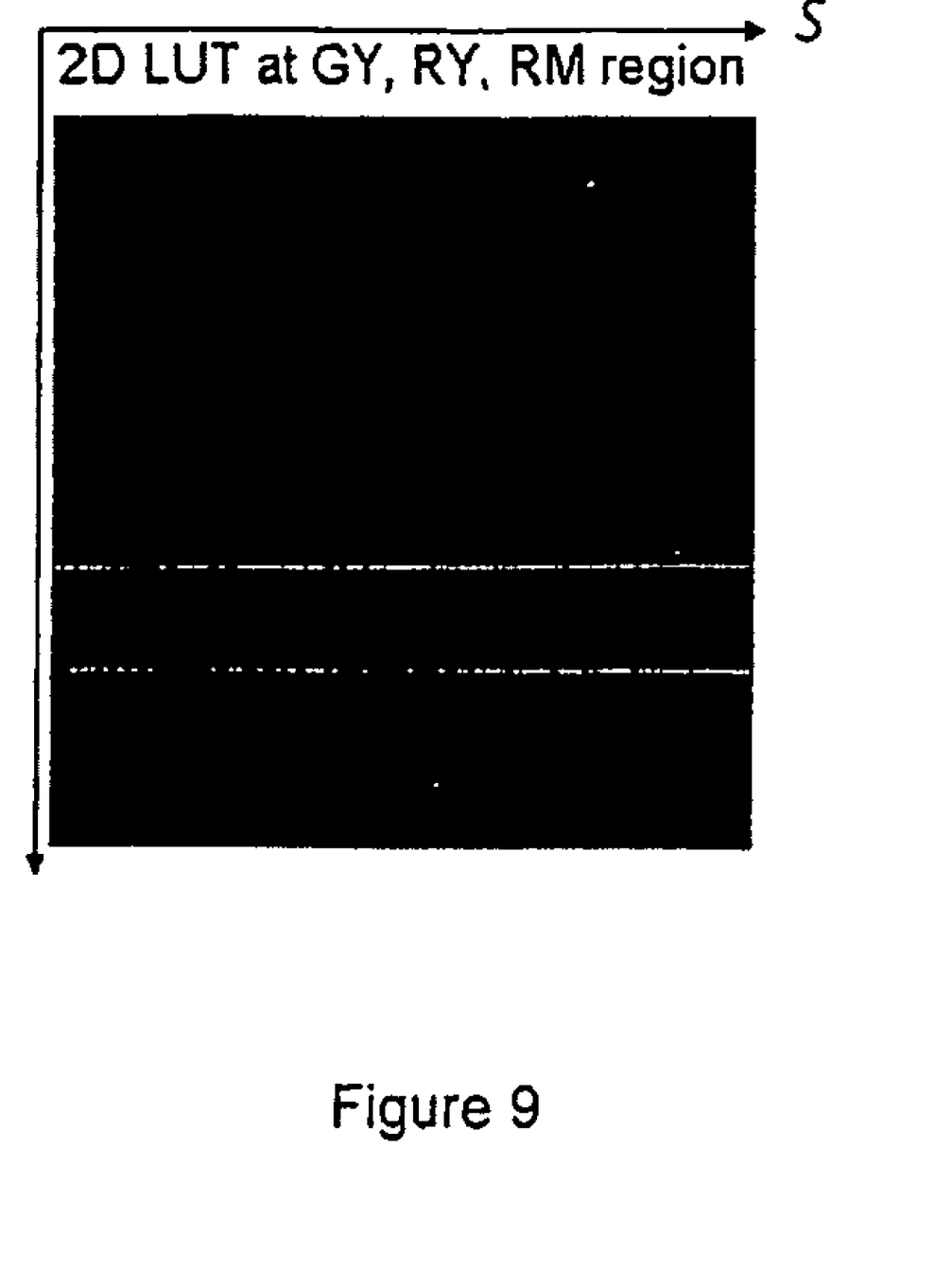
FIG. 9 illustrates a two dimensional LUT at green-yellow, red-yellow, and red-magenta region.

The calculation uses a two dimensional LUT for $f_{GY}(\cdot,\cdot)$ and the same two one dimensional LUTs for $p(\cdot)$ and $q(\cdot)$. The two dimensional LUT $f_{GY}(\cdot,\cdot)$ is illustrated in FIG. 9 where the two dimensional LUT $f_{GY}(\cdot,\cdot)$, $f_{RY}(\cdot,\cdot)$, $f_{RM}(\cdot,\cdot)$. The x-axis is the first argument S, and the y-axis is the second argument H. White: 1; black: 0; gray: between 0 and 1.

The red-yellow 340 (red>green>blue), may be defined as follows:

$$S = \frac{r-b}{r}$$

$$H = \frac{g-b}{r-b}$$

$$V' = r$$

$$skyScore = f_{RY}((r-b)^*p(r), (g-b)^*q(r-b)) \cdot w(V)$$

The calculation uses a two dimensional LUT for $f_{RY}(\cdot,\cdot) = f_{GY}(\cdot,\cdot)$ and the same two one dimensional LUTs for $p(\cdot)$ and $q(\cdot)$.

The two dimensional LUT $f_{RY}(\cdot,\cdot)$ is illustrated in FIG. 9. In this case, $f_{RY}(\cdot,\cdot)$ and $f_{GY}(\cdot,\cdot)$ are the same.

The red-magenta 350 (red>blue>green), may be defined as follows:

$$S = \frac{r-g}{r}$$

$$H = \frac{b-g}{r-g}$$

$$V = r$$

$$skyScore_{RM}(H, S, V) = f_{RM}((r-g)^*p(r), (b-g)^*q(r-g)) \cdot w(V)$$

The calculation uses a 2D LUT for $f_{RM}(\cdot,\cdot) = f_{RY}(\cdot,\cdot) = f_{GY}(\cdot,\cdot)$ and the same two 1D LUTs for $p(\cdot)$ and $q(\cdot)$.

The two dimensional LUT $\cdot_{RM}(\cdot,\cdot)$ is illustrated in FIG. 9 where the two dimensional LUT for $f_{GY}(\cdot,\cdot)$, $f_{RY}(\cdot,\cdot)$, $f_{RM}(\cdot,\cdot)$. The x-axis is the first argument S, and the y-axis is the second argument H. White: 1; black: 0; gray: between 0 and 1.

Figure 10:
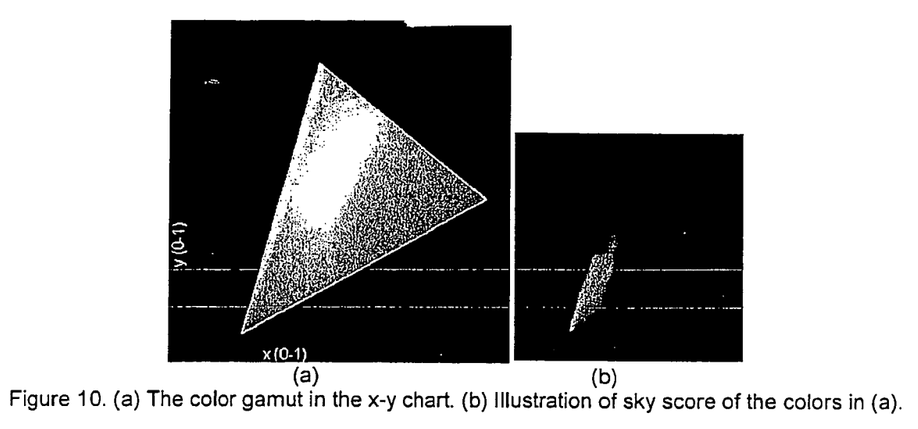
FIG. 10 illustrates the color gamut in the x-y chart and sky score of its colors.

The sky score for the sRGB color gamut is illustrated in two dimensions in FIG. 10 (can we use a color version of FIG. 10a?). One may notice most sky colors are in the blue-cyan and blue-magenta areas.

The sky color detection 50 thus creates a sky color likelihood map 60 based upon the lowpass image 30 in combination with the two dimensional and one dimensional sky score look up tables 130. In general, the process for the sky color detection 50 is a pixel by pixel analysis of the lowpass image 30. However, if desired, the sky color detection 50 could include a spatial analysis.

Figure 11:
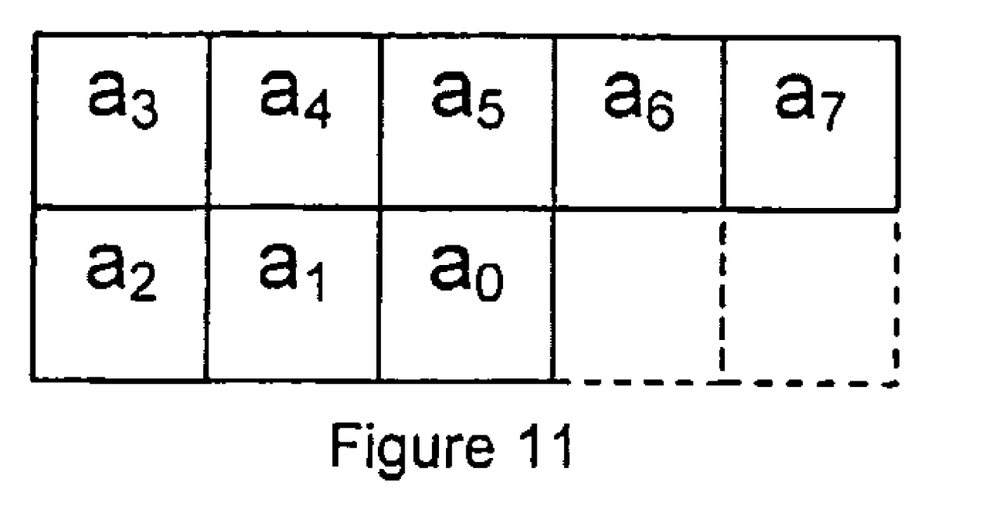
FIG. 11 illustrates the IIR filtering on sky color likelihood map.

The sky color likelihood map 60 tends to be not smooth which may cause undesirable artifacts (such as contouring artifacts) in the saturation-enhanced sky images 220. The system may use a filter 70, such as an image-driving non-linear lowpass filter to smooth the sky color likelihood map 60 to reduce potential contouring artifacts. Referring to FIG. 11, to provide a computationally efficient filter, preferably an infinite impulse response (e.g., IIR) filter is used. Specifically, the filter 70 may be defined as:

$$\text{sky score}(x, y) = a_0^* \text{sky score}(x, y) + a_1^* \text{sky score}(x-1, y) +$$
$$a_2^* \text{sky score}(x-2, y) + a_3^* \text{sky score}(x-2, y-1) +$$
$$a_4^* \text{sky score}(x-1, y-1) + a_5^* \text{sky score}(x, y-1) +$$
$$a_6^* \text{sky score}(x+1, y-1) + a_7^* \text{sky score}(x+2, y-1)$$

where x is the row index, y is the column index, and $\alpha_0 + \alpha_1 + \alpha_2 + \alpha_3 + \alpha_4 = 1$. The IIR filter may be implemented in such a manner that it only uses a one line buffer for the sky score, without requiring life buffers for the RGB.

Figure 12:
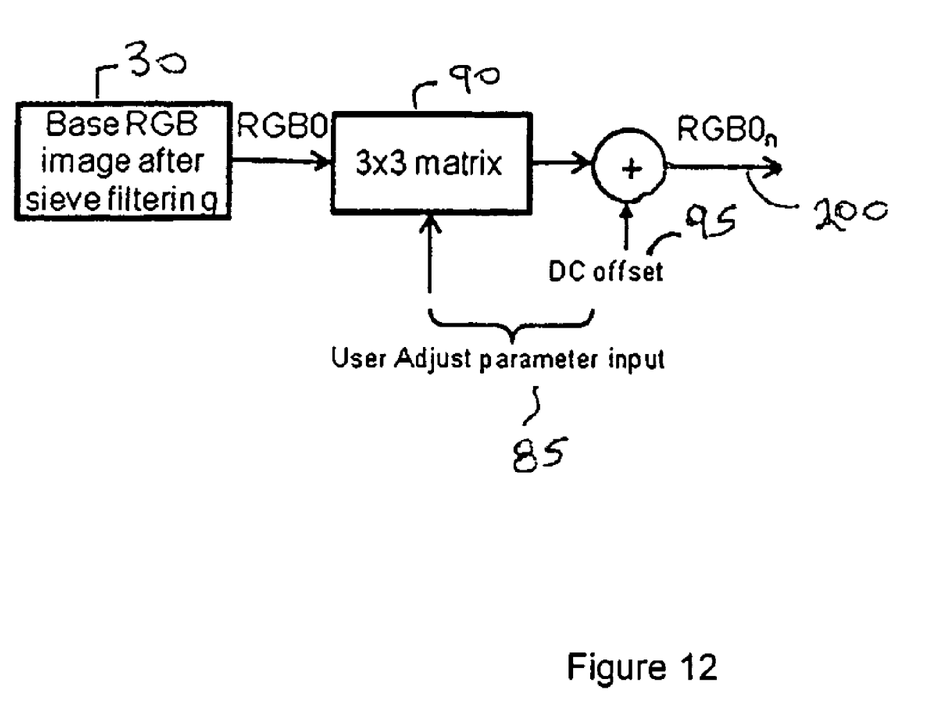
FIG. 12 illustrates modification of the output based upon user adjusted parameter input.

An adjustable color enhancement 80 for the sky color may be performed. Referring to FIG. 12, the adjustment technique receives the lowpass image 30 and adjusts the lowpass image 30 based upon a user adjustment 85 that includes a matrix operation 90 and a DC offset 95.

The 3×3 matrix 90 and the DC offset 95 are generated by users according to their preference, and received by the system. There are many techniques that may be used to adjust the 3×3 matrix and DC offset. As a preferred embodiment, users can adjust hue, saturation and brightness in the YCbCr space, and then the adjustment parameters are converted to a new 3×3 matrix and DC offset. In this case, the 3×3 conversion matrix can be express as follows where α represents the luminance enhancement amount, β represents the saturation boosting amount, and θ represents the amount of hue angle rotation. As one embodiment the above equation, one sets $\alpha=1$, $\beta \in [1\ 2]$, and $\theta=0$. This way, one may achieve luminance and hue preservation while enhancing the saturation of the sky region.

$$\begin{bmatrix} \alpha & 0 & 0 \\ 0 & \beta\cos\theta & -\beta\sin\theta \\ 0 & \beta\sin\theta & \beta\cos\theta \end{bmatrix}$$

One benefit of adjustable color enhancement is that it allows different viewer groups to readily adjust the amount of saturation to be enhanced, some viewer group preferring more saturated colors than the others can adjust the saturation boosting amount accordingly.

The output 200 is provided to a sky score based blending 210.

The enhanced image pixel output 220 of the sky score based blending 210 is a linear combination of the original input pixel 30 and the enhanced pixel 200 adjusted by the output 230 of the filter 70. It can be expressed as:

$$RGB\_OUT(c) = skyScore(c) \times RGB0_n(c) + (1 - skyScore(c))^* RGB0(c)$$

This equation indicates that pixels with low sky color likelihood will not be enhanced too much, and the pixels with high sky color likelihood will be heavily enhanced.

To provide the final image, the high pass image 40 is added 240 to the sky score based blended image 220.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An image enhancement technique comprising the steps of:
   (a) receiving an input image and providing a low-pass filtered image that maintains a substantial number of edges therein;
   (b) processing said low-pass filtered image to provide respective scores for pixels of said low pass filtered image based on a likelihood map of said image denoting respective likelihoods that pixels of said image are a sky color, said likelihood map constructed by: (i) dividing a color space of said image into a plurality of areas; (ii) defining HSV values independently for each of said plurality of areas; and (iii) using the HSV values of each area to determine said likelihoods;
   (c) filtering said low-pass filtered image based upon a user selection to selectively enhance said sky color;
   (d) blending said low-pass filtered image and said filtered low-pass filtered image with one another based upon said scores;
   (e) combining said blended image with a high pass filtered said input image to provide an enhanced imaged.

2. The image enhancement technique of claim 1 wherein said filter is a spatial filter.

3. The image enhancement technique of claim 2 wherein said filter is a sigma filter.

4. The image enhancement technique of claim 3 wherein said filter is calculated based upon $$I_{LP}(x, y) = \frac{\sum_{(i,j) \in E \& |I(i,j) - I(x,y)| < T} I(i, j)}{N(x, y)}.$$

5. The image enhancement technique of claim 1 wherein said identification is based upon at least one look up table.

6. The image enhancement technique of claim 5 wherein said at least one look up table includes a two dimensional look up table.

7. The image enhancement technique of claim 6 wherein said at least one look up table includes a one dimensional look up table.

8. The image enhancement technique of claim 7 wherein said at least one look up table includes at least two two dimensional look up tables and at least two one dimensional look up tables.

9. The image enhancement technique of claim 1 wherein said identification is based upon a non-RGB color space.

10. The image enhancement technique of claim 9 wherein said non-RGB color space is based upon saturation.

11. The image enhancement technique of claim 10 wherein said non-RGB color space is based upon value.

12. The image enhancement technique of claim 11 wherein said non-RGB color space is based upon hue.

13. The image enhancement technique of claim 1 wherein said identification is based upon adjusting for low luminance blue colors.

14. The image enhancement technique of claim 1 wherein said identification further includes a smoothing filter to smooth said identification.

15. The image enhancement technique of claim 14 wherein said smoothing filter is a non-linear low-pass filter.

16. The image enhancement technique of claim 15 wherein said smoothing filter is an IIR filter.

* * * * *